No. 707,863. Patented Aug. 26, 1902.
J. NEUBECKER.
APPARATUS FOR COOLING OR HEATING LIQUIDS.
(Application filed Oct. 12, 1901.)
(No Model.)

UNITED STATES PATENT OFFICE.

JEAN NEUBECKER, OF OFFENBACH-ON-THE-MAIN, GERMANY.

APPARATUS FOR COOLING OR HEATING LIQUIDS.

SPECIFICATION forming part of Letters Patent No. 707,863, dated August 26, 1902.

Application filed October 12, 1901. Serial No. 78,458. (No model.)

*To all whom it may concern:*

Be it known that I, JEAN NEUBECKER, a subject of the Grand Duke of Hesse, German Empire, residing at Offenbach-on-the-Main, Germany, have invented certain new and useful Improvements in Apparatus for Cooling or Heating Liquids, (for which I have applied for a patent in Germany, dated April 22, 1901, No. 5,559 /I 17$^d$,) of which the following is a specification.

Figure 1:
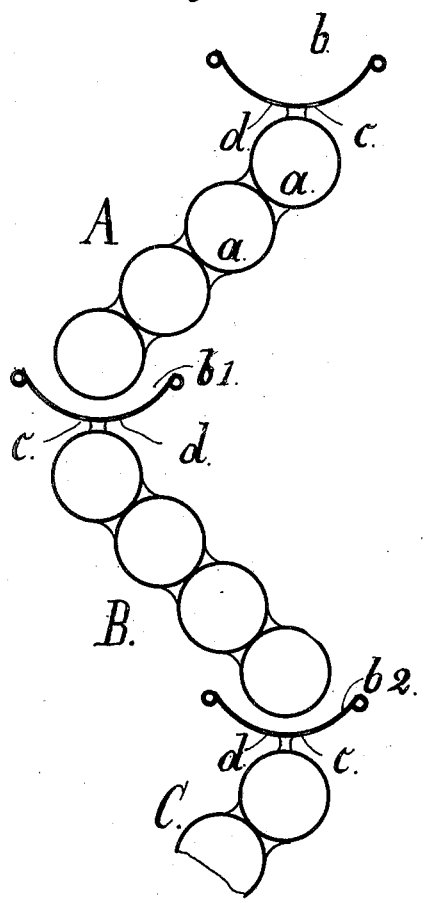
Figure 2:
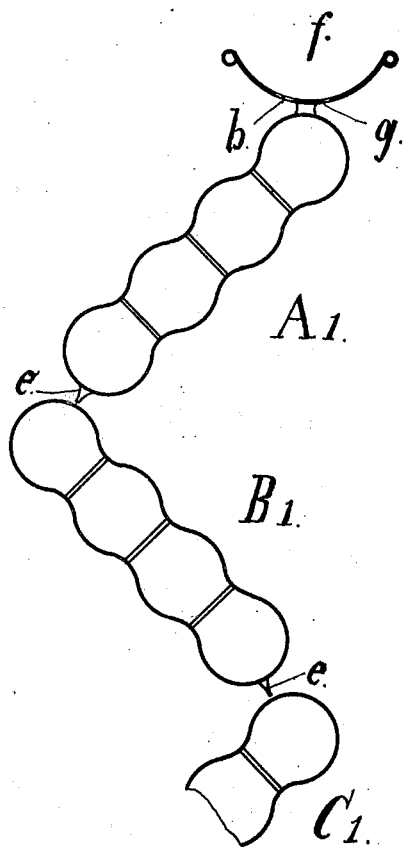

The invention relates to the cooling or heating of liquids—for instance, the cooling of beer—by means of surface refrigeration or, as the case may be, by surface heating. The surface of my refrigerator consists, for instance, of groups or batteries of tubes disposed at a certain inclination above each other and leading in opposite directions. These different batteries have no direct connection with each other; but the liquid to be cooled will pass from one battery to the battery beneath through troughs, as shown in Figure 1, or over strips $e$, as shown in Fig. 2. The troughs and connecting-strips are so constructed that a larger quantity of liquid will always run over the upper side of each battery than runs over the under side, and at the end of each single battery the liquids will mix together, forming an exchange of heat.

Figure 3:
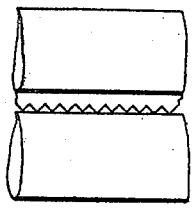
Figure 4:
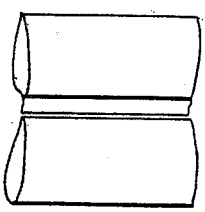
Figure 5:
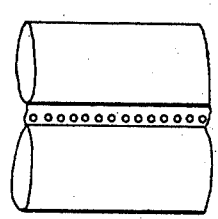

In the accompanying drawings, which illustrate the invention, Fig. 1 shows one section of the apparatus. Fig. 2 is a sectional view illustrating a modification. Figs. 3, 4, 5 show the different arrangements by means of which the liquid will be distributed in unequal quantities over the batteries, the latter being inclined at a certain angle above each other and running in opposite directions.

$a\ a$ are tubes of round or other suitable sectional form, which are connected with each other in the usual way, so as to form the proper surface for cooling. The groups of tubes A B C formed after this manner are disposed with advantage at such an inclination to each other that the lower part of the upper battery A is close to the upper part of the next battery B below, running in the opposite direction, &c. Fig. 1 shows between each battery, as well as above the uppermost battery A, a trough $b$, which has two rows of holes $c\ d$, arranged in such a way that the number or size of those distributing the liquid over the upper side of the battery below are more or larger than the holes which guide the liquid over the under side of the said battery. The result of this will be that the liquid to be cooled runs in larger quantity over the upper side of each battery, while the remainder— that is, the smaller quantity of the liquid— runs over the under side of the batteries. By doing this the adhesion of the liquid running over the under sides of the batteries is greater than the weight of the liquid, and the latter therefore does not fall off, but runs in a steady thin film. At the lower part of each battery the liquid which had been running in different quantities over both sides of the battery comes together, an exchange of heat takes place, and the distributing of said liquid over the battery below takes place through the trough $b$ with the holes $c\ d$ of different sizes again, so that the greater part of the liquid runs over the upper side and the smaller part over the under side of the battery below, &c.

Fig. 2 shows above the battery $a'$ a trough similar to trough $b$ with two rows of holes $g\ h$, one row having again larger or more openings is above the upper side of the battery A, while the row with smaller or less openings is above the under side. Therefore more liquid runs over the upper side than over the under side of said battery.

Now in place of a second, third, &c., trough $b'\ b^2$, &c., as shown in Fig. 1, Fig. 2 shows strips $e$ with openings, as given in Figs. 3, 4, 5, between the different batteries, also for the purpose of distributing more liquid over the upper side than over the under side of each battery. To obtain this effect, the batteries have to be located in such a way above each other that the strips $e$ form a kind of a trough on the top part of each battery in the direction of the upper side. By this arrangement the larger quantity of liquid coming from the upper side of each battery is collected somewhat, so that one part of same rises and passes over the under side of the battery below, while the other part passes through the openings in the strips $e$ and mixes with the liquid coming from the under side of the battery above. Therefore the greater quantity of the liquid again passes over the upper sides of the batteries, &c.

The apparatus shown in Figs. 1 and 2 is for the same purpose of forcing the larger quantity of liquid over the upper side and the smaller quantity over the under side of each battery of a surface refrigerator. The liquid is mixed thoroughly at the end of each battery, a perfect exchange of temperature takes place, and thus the cooling effect of the refrigerator increased, and the splashing off of liquid is prevented.

As with other apparatuses of this class, it is manifest that if the apparatus be used for cooling beer or other liquid, a liquid of lower temperature, such as ice-water or brine, will be passed through the interior of the tubes $a$, while the beer or other liquid is allowed to flow over the surface, as shown and described. On the other hand, if the apparatus be used for cooling a fluid passing through the pipes—as, for instance, for the purpose of a steam-condenser—cold liquid will be passed over the surface.

What I claim, and desire to secure by Letters Patent of the United States, is—

1. The combination of the successive batteries of tubes, arranged one above and inclined to the other in opposite directions, and means for delivering a larger quantity of liquid to the upper side and a lesser quantity to the under side of said batteries, as and for the purpose set forth.

2. An apparatus for cooling liquids, consisting of a series of batteries of cooling-pipes arranged one above another, said batteries being inclined successively in opposite directions, and means interposed between the successive batteries partially arresting the liquid flowing from the surface of one battery to that of the next below and delivering a larger quantity of liquid to the upper surface and a lesser quantity to the under surface of each battery, as explained.

3. The combination of successive batteries of tubes, said batteries being arranged one above and inclined to the other and in opposite directions; and troughs having two rows of holes above the successive batteries for distributing liquid over the upper and under sides of said batteries, the capacity of holes for distributing liquid over the upper side exceeding that of those distributing liquid over the under side, as and for the purpose set forth.

JEAN NEUBECKER.

Witnesses:
 ADOLF ALTMANN,
 BERNHARD KAISER.